Feb. 5, 1946.　　　　J. H. GIESEN　　　　2,393,982
FRACTURE REDUCER
Filed Jan. 6, 1945　　　　6 Sheets-Sheet 1

Inventor
J. H. Giesen
By ＳＶＢush
Attorney

Feb. 5, 1946.  J. H. GIESEN  2,393,982
FRACTURE REDUCER
Filed Jan. 6, 1945  6 Sheets-Sheet 2

Inventor
J. H. Giesen
By J. E. Bush
Attorney

Feb. 5, 1946.　　　J. H. GIESEN　　　2,393,982
FRACTURE REDUCER
Filed Jan. 6, 1945　　　6 Sheets-Sheet 3

Inventor
J. H. Giesen

By
Attorney

Feb. 5, 1946.    J. H. GIESEN    2,393,982
FRACTURE REDUCER
Filed Jan. 6, 1945    6 Sheets-Sheet 4

Feb. 5, 1946.  J. H. GIESEN  2,393,982
FRACTURE REDUCER
Filed Jan. 6, 1945                   6 Sheets-Sheet 5

Inventor
J. H. Giesen
By
S. E. Bush
Attorney

Feb. 5, 1946. J. H. GIESEN 2,393,982
FRACTURE REDUCER
Filed Jan. 6, 1945 6 Sheets-Sheet 6

Patented Feb. 5, 1946

2,393,982

UNITED STATES PATENT OFFICE 2,393,982

FRACTURE REDUCER

Josef H. Giesen, United States Navy

Application January 6, 1945, Serial No. 571,643

12 Claims. (Cl. 128—84)

(Granted under the act of March 3, 1883, as amended April 30, 1928; 370 O. G. 757)

This invention relates to fracture reducing equipment and more particularly to a device whereby fractures may be quickly reduced and external reenforcing means applied by a simple method in such manner that the patient may generally be unrestricted in his motions of the adjacent joints, and whereby a sufficient support is provided between the broken fragments of the fractured bone to replace the functions of the bone, so that the patient may generally be released from the hospital immediately or within comparatively short time after the bone is reduced.

The object of this invention is to construct a novel, useful and complete surgical device for reducing bone fractures, whereby an outer plaster of Paris support may be applied between fixation pins transfixed into the fragments of the bone by the aid of this device, while the fracture is reduced quickly and easily by the operation of the several parts of this device before the plaster of Paris is applied.

Another object is to construct a fracture reducer, comprising mechanism having a wide range of application; speed and simplicity in operation; adaptability to a large variety of fractures; adaptability to the use of varying sizes of wires, threaded pins and unthreaded pins of varying lengths, in combination with plaster of Paris, whereby fractures of any bones, accessible by piercing through the outside of the body, may be readily treated, without the danger of X-ray burns of the hands to the operator, and resulting in a considerably shortened period of hospitalization of the patient.

A further object is to construct a device for use in reducing fractures, comprising a base on which are mounted two stirrup assemblies, each of which consists of an outer and an inner stirrup, the stirrups being mounted on adjustably swivelled supports which are longitudinally adjustable along the base, the stirrups having their ends pivoted on a common axis, the outer stirrup being also circumferentially adjustable on its support, the inner stirrup being pivotally adjustable about said common axis, there being a drill shaft assembly mounted through the pivoted ends of the stirrups from each side thereof, a number of carriage assemblies attachable to the stirrups at any selected points thereof, and means for universally adjusting the drill shaft assemblies on these carriages, the drill shafts being supplied with No. 1 Jacobs chucks or other similar means for holding the fixation pins when they are driven through the bone fragments, said drill shafts also having means for locking them in fixed position after fixation.

Other and more specific objects will become apparent as the description of the details of this device proceeds, having reference to the accompanying drawings, wherein.

Referring now more specifically to the several figures of the drawings, in which like parts are designated by the same numerals; the device is composed of two stirrup assemblies, each of these consisting of an outer stirrup 1 and an inner stirrup 2 shaped in a half circle; the inner stirrup revolves about the common axis 3 with the outer one in such fashion that a complete circle may be described about the fractured member to which the device is applied. In most instances, such a complete circle is unnecessary. A unit 4 referred to as the carriage assembly may be attached to the inner stirrup or the outer one, and thus a bone fragment may be approached almost at any degree in the circle. The carriage assembly has constructed within it, a ball and socket mechanism 5 which allows further choice of site of insertion of the pin 6 or screw 6'.

Figure 1:
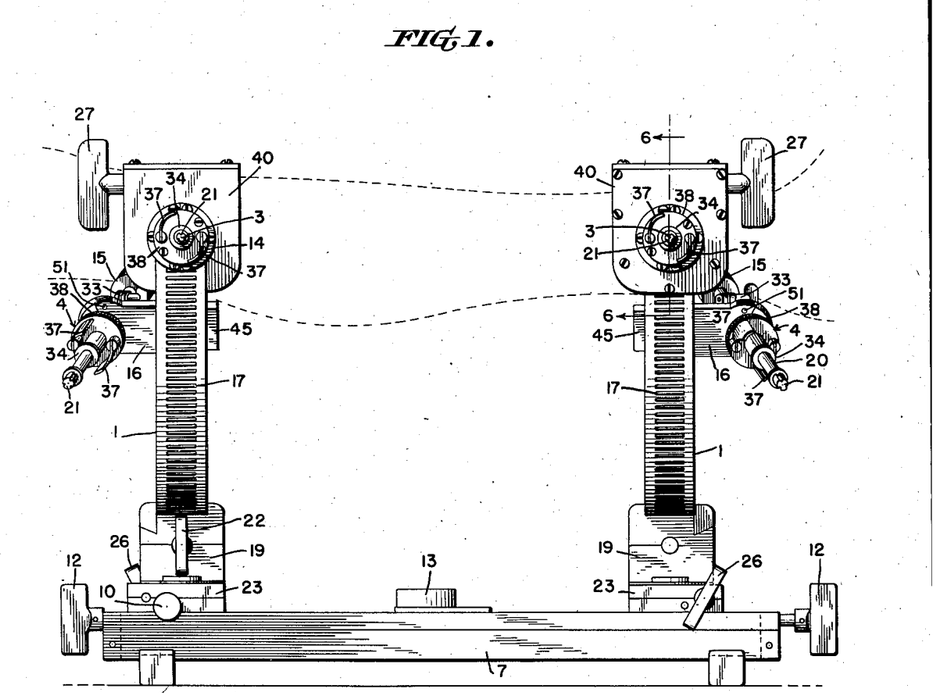
Fig. 1 is a side elevational view of the assembly.
Figure 2:
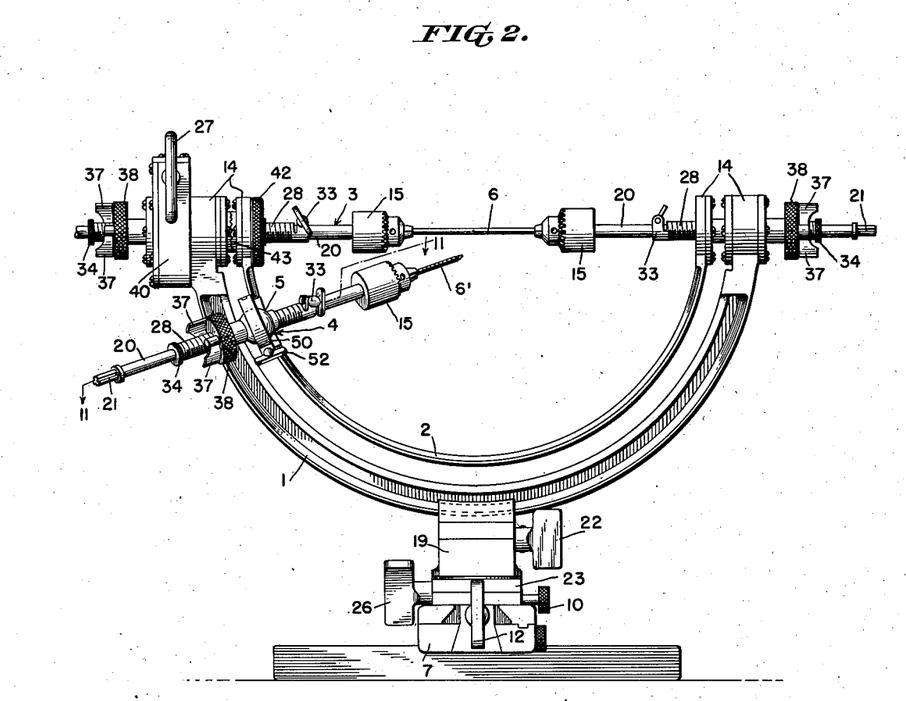
Fig. 2 is an end view thereof.
Figure 3:
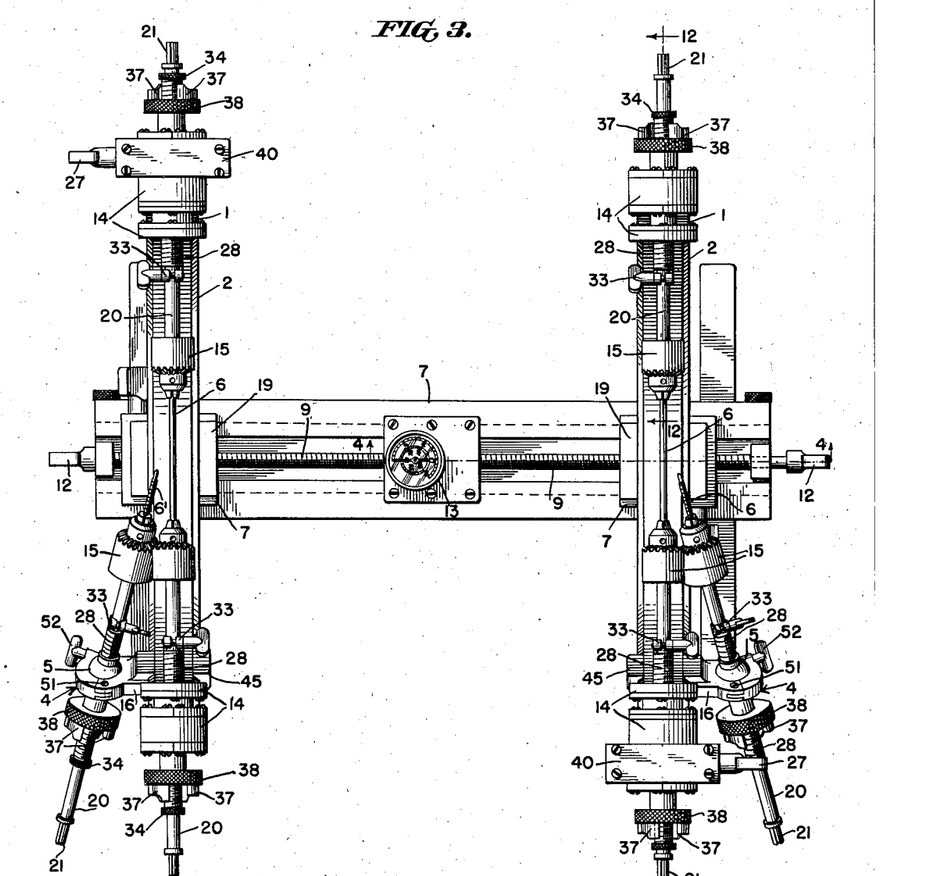
Fig. 3 is a plan view of this assembly.
Figure 4:
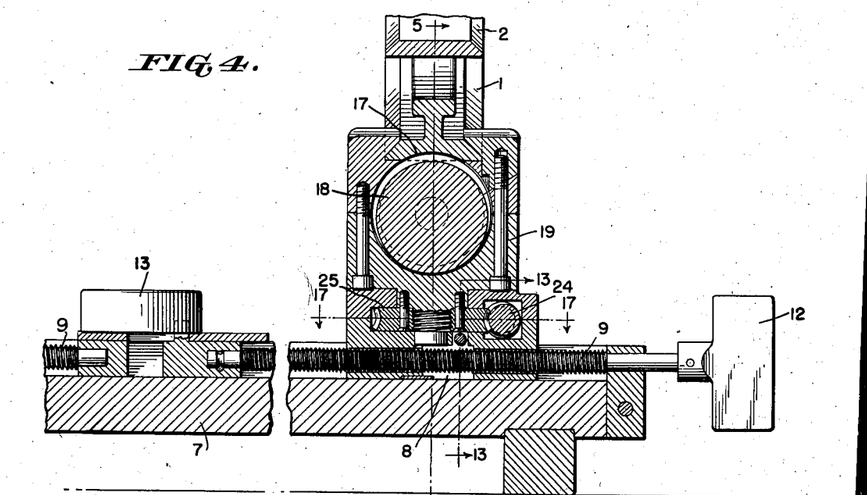
Fig. 4 is a sectional detail view taken on the line 4—4 in Fig. 3.
Figures 5, 16:
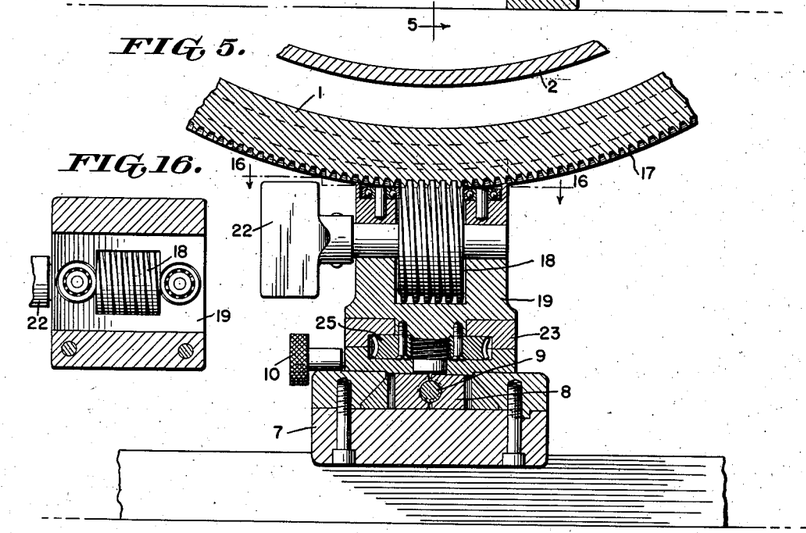
Fig. 5 is a section taken along the line 5—5 in Fig. 4.
Fig. 16 is a sectional view taken along the line 16—16 of Fig. 5.
Figure 6:
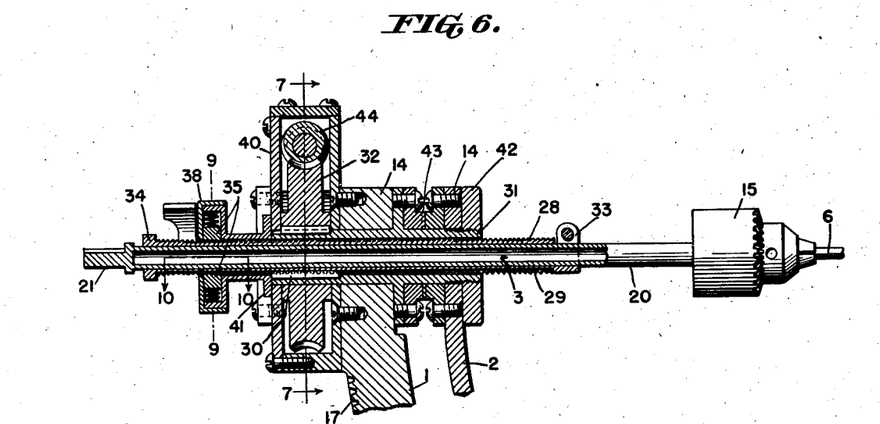
Fig. 6 is a sectional detail view of one of the drill shaft assemblies through the ends of the stirrups, taken along the line 6—6 of Fig. 1.
Figures 7, 8, 9, 10:
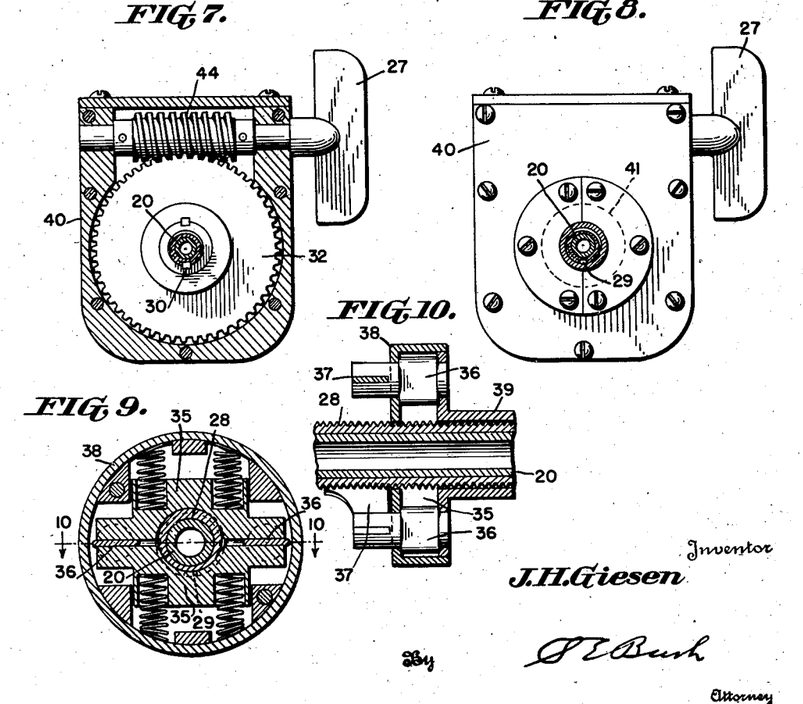
Fig. 7 is a sectional view of the gear housing taken along line 7—7 of Fig. 6.
Fig. 8 is a view of this gear housing with its cover in place.
Fig. 9 is a sectional detail view of the split nut and housing, taken along the line 9—9 of Fig. 6.
Fig. 10 is a section of this housing taken along line 10—10 of Fig. 9.
Figures 11, 18, 19, 20, 23, 24:
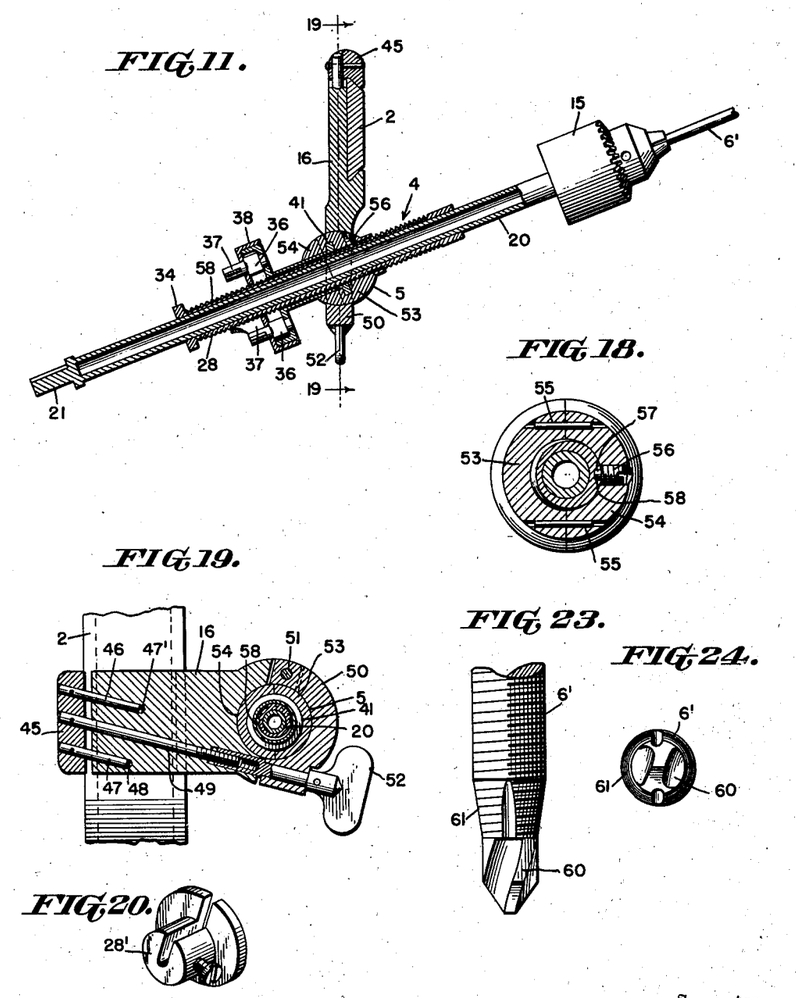
Fig. 11 is a sectional detail view of one of the drill shaft assemblies, taken along the line 11—11 of Fig. 2.
Fig. 18 is a sectional view of the ball halves of the ball and socket joint on one of the drill shaft assemblies.
Fig. 19 is a sectional view along the line 19—19 of Fig. 11 showing the construction of one of the drill shaft assembly carriages attached to an inner stirrup.
Fig. 20 is a perspective view of a lug which might be used in connection with the pins or screws of the present invention for furnishing a better anchorage thereof in the plaster of Paris casts used between the several pins or screws, transfixed into the fragments.
Figs. 23 and 24 are two enlarged detail views of the end of one type of threaded pin which may be used in combination with the present device.
Figure 12:
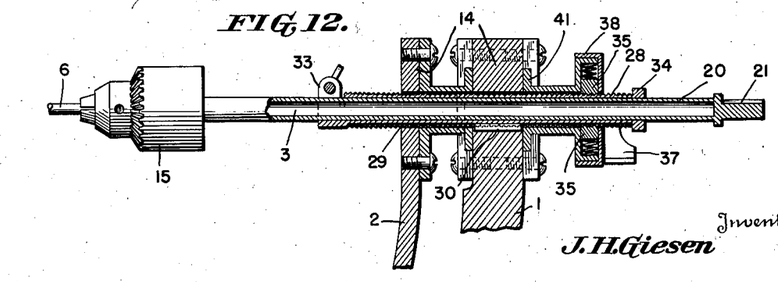
Fig. 12 is a sectional view of the drill shaft through the ends of the stirrups opposite that shown in Fig. 6, and as indicated by the section line 12—12 of Fig. 3.
Figure 13:
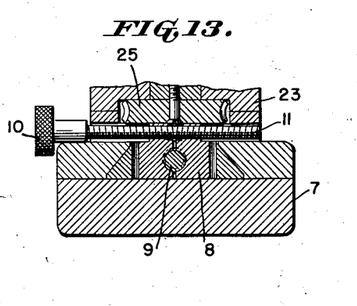
Fig. 13 is a detail sectional view taken along the line 13—13 of Fig. 4, showing the split nut, releasing screw, and a section of the support swivelling wormwheel.
Figure 14:
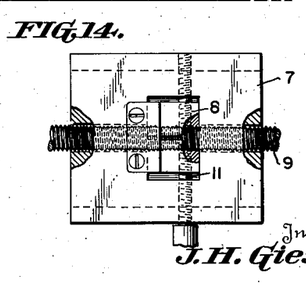
Fig. 14 is a bottom plan view of the slide block of the support of one of the stirrup assemblies.
Figure 15:
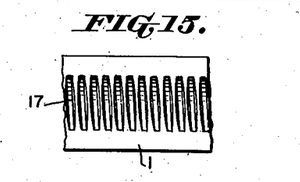
Fig. 15 is a plan view of the teeth cut in the outer face of the outer stirrup for its circumferential adjustment.
Figure 17:
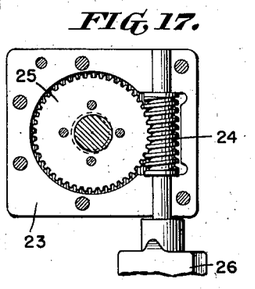
Fig. 17 is a section through the support swivelling worm case taken on the line 17—17 of Fig. 4.
Figure 21:
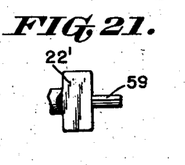
Figs. 21 and 22 show two views of a modification of the hand screw used in circumferentially adjusting the stirrup assemblies, whereon a projection 59 is provided on the end thereof to which a drill may be applied for speedy operation thereof when desired.
Figure 22:
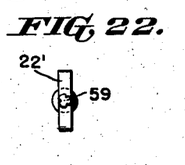

An illustrative form of the threaded pins or screws 6' is shown in Figs. 23 and 24. It is a combination drill, tap and screw. The drill portion 60 and tap portion 61 are made very short so as to obtain a minimum penetration of the bone before firm grip in the bone is established by the screw portion. A combination of this type makes transfixion of screws through bone structures much easier and quicker and eliminates the danger of excessive traumatization of the patient. Besides insertion of straight threaded pins, the drill assemblies shown in this device may be used for inserting headed bone screws such as the Sherman bone screws and others, by inserting a special type of screw driver blade in the chuck having a novel bone screw holder attachment, which is made the subject of another application Serial No. 582,476, filed March 13, 1945.

These bone screws are preferably modified at their ends to form a combined drill, tap and screw. The use of this combination of drill, tap and screw has the advantages of less chances of burning of the bone tissues which often results in a preliminary drilling operation where this combination is not used. Also there is no separate drilling operation necessary, and a minimum amount of force is necessary in transfixion even of the larger sizes of screws since the proper size drill and tap are always combined with any screw size.

The above-mentioned stirrup assemblies are adjustably supported on a base 7 in such fashion that the latter allows a maximum of approximately 20 inches and a minimum which may be as little as 3 inches between the two sets of the stirrups. This sliding movement may be quickly effected by releasing the so-called half-nut mechanism 8 from the threaded screw 9 in the base. This is done by turning the knurled knob 10 of the turnbuckle screw 11. If a slow, steady, powerful movement of the stirrup assembly is desired, the half-nut 8 may be quickly attached to the traction screw 9 in the base by merely turning the knob 10 in the opposite direction. By turning the handles 12 at either end of the base, a slow steady movement of considerable power may be affected, obtaining traction to any desired degree. By reversing the direction of the handles, compression of the bone fragments may be obtained. In actual operation, one stirrup assembly is allowed to remain stationary and by means of a gauge 13, registering in pounds, the pull or traction in terms of pounds is always known to the operator. No danger of rupturing blood vessels or nerves is present by excessive pull upon the fragments. This gauge should be calibrated and register up to 40 pounds traction. Sterilization is likely to damage the mechanism in this gauge, and arrangements should be provided for removing it during sterilization.

Two screws are generally inserted into each bone fragment of single, long bones for full control thereof. The pivots 14 of the inner and outer stirrups at their common axis 3 are so constructed that they will each accommodate a drill shaft assembly. This assembly has a chuck 15 permanently attached to it for mounting a pin, wire, or screw 6 therein. This chuck should be of the type of construction as the No. 1A Jacobs chuck, and is the same for all of the carriage assemblies. In other words, although all of the pins and screws may not lie in the same plane, their insertion is identical by identical means. One pin or screw is carried by a drill shaft assembly on a carriage 16, the other by the drill shaft assembly or assemblies in the pivoted ends 14 of the inner and outer stirrups. It will be further noted that each set of stirrups with its attachments is identical to its opposite half not only from the standpoint of construction, but also from the standpoint of operation.

The outer stirrup 1 has gear teeth 17 machined along its outer surface for the purpose of articulating with the gear in a gear box 19 which forms a part of the support beneath the stirrups. This gear box contains a worm 18 attached to the handle 22. By these handles controlled axial rotation of either bone fragment is obtained. The gear ratio used in the present device is 25:1. The gear box above-referred to is in turn attached to another gear box 23 within the support for the stirrups, lying directly beneath the first one. This gear box also contains a worm 24 and wormwheel 25 attached to handle 26. A fragment attached to the stirrup will therefore turn to the right or left, that is, sidewise rotation, when the handle 26 is turned. A gear ratio 25:1 is used here also. Since the inner stirrup revolves about the common axis with the outer stirrup, it is seen at a glance that the fragment attached to the common axis of these stirrups and to the inner stirrup, as is the customary fashion in fixing fragments of single, long bones, must elevate or depress as the inner stirrup is turned about the common axis; that is, controlled rotation in a vertical plane through the axis of the bone is thus obtained. The handle controlling this motion may be seen at 27. A gear ratio of 72:1 is used here.

Traction is obtained as before-mentioned by turning the handle 12 attached to the traction screw 9 in the base, thus it is seen that there is elevation or depression, motion to the right or left, and axial rotation of about 170° of either fragment, which controlled motion will reduce any fragment, providing sufficient power is present in the device to overcome the resistance of the muscles, fasciae, etc. By the use of the above-mentioned gear ratios as well as by the powerful screw mechanisms, the traction screw of the base, and those of the half-nut mechanisms, any excepting the most severe resistance should be easily overcome. Each of the handles concerned in these operations should be about 2½ inches in length. Thus the fragment ends may be accurately and quickly approximated.

The basic mechanical principles of this device are sound. Its operation is simple, in that each half of the device is identical to the other half, and that no matter what the site of the fracture, the screws or pins or wire used are all inserted in an identical fashion. Its application to a fractured member is quick, requiring no longer than fifteen minutes in most cases. It is believed that fractures, by the use of this device, may be reduced quickly, easily, and safely with a minimum of operative risk, a minimum period of hospitalization, a minimum of hospital days, with the aid of a minimum of medical personnel, thereby releasing the latter for duties elsewhere. The use of this instrument has simplified the treatment and handling of large numbers of fractures incident to modern war. In connection with the use of this device, circular plaster of Paris casts extending only far enough to incorporate the pins should be used, so as to permit joint motion above and below the fracture site. In simple fractures, plaster of Paris splints will prove sufficient.

This surgical device is an instrument designed to handle practically all fractures of long bones such as the femur, the tibia, the fibula, all of the leg. Similarly, it will handle fractures of the humerus, the radius and the ulna, all of the arm. In addition, the reduction of the following special fractures may be effected through its use: the collar bone or clavicle, the bones of the forearm, the metacarpals of the hand, the femoral neck, the Pott's fracture, the metatarsals No. 1, 2, 3, 4 and 5 of the foot, and the os calcis. The manner in which these special fractures are handled through the use of this instrument will be hereinafter described.

This fracture reduction instrument may be used over and over again without sacrificing any of its parts; that is to say, the pins, screws, or wire which are transfixed into the bone subsequently to be incorporated into the plaster of Paris bandage are the sole items of equipment which are sacrificed. Small lugs 28' which were designed to augment the fixation of these screws and wire or pins are likewise sacrificed, but these are not part of the instrument, being only accessories which positively insure fixation of the pins, etc., in the plaster bandage. The pins, screws, and lugs may be salvaged after the plaster of Paris bandage is removed. Those which have been used have been chromium plated in order to safeguard them against rust and deterioration, and may be used over and over again. It will be observed that no matter what the site of fracture or the size of the bone in question, no other piece of equipment is required other than a drill, which must obviously be used in the insertion of screws or pins or wire into the bone, whether by this or any other method.

The wires, pins, or screws may be made of corrosion resistant steel and may be made in any machine shop, as the threads are standard ones. These may be cut to the desired lengths. In this instrument either threaded pins, wires, or screws may be used. This instrument has its chucks constructed so that any one of the sizes, $\frac{3}{16}$, $\frac{1}{8}$, $\frac{1}{16}$, $\frac{5}{64}$ and $\frac{3}{32}$ inches may be equally accommodated. This instrument can accommodate pins or screws up to lengths of nine inches.

By the use of this instrument, open operation now often required in the treatment of the fractures mentioned above will be unnecessary. In thirty minutes all except the most complicated fractures should be reduced, plaster of Paris bandage applied, the instrument detached and ready for use again. This feature is obviously of tremendous benefit in wartime. The long periods of hospitalization and tedious after-care and the danger of long anesthesia should be unnecessary. In short, its use will lessen the burden of the surgical staff wherever it is used. Cases of fracture of the upper extremity should be up and about in twenty-four hours, and those of the lower extremity within 48 to 72 hours with or without crutches. This is obviously an ideal method under modern war conditions when the older methods of treatment must be dispensed with. Patients so treated are made ambulatory and self-sufficient, and ideal as compared with immobile, insufficient ones.

The entire instrument may be sterilized in any ordinary sterilizer in the usual surgical setup. This instrument further allows a marked degree of latitude as regards the site of fixation of the fragments; thus septic areas, burned areas, and unhealthy skin may be avoided. Three or more pins may be inserted instead of two if desired. By its use, X-ray burns of the operator's hands will not occur, as the manipulation of fragments is done mechanically at some distance from the X-ray tube.

Referring again to the drawings the drill shaft assemblies mounted in the pivoted ends of the stirrups are axially lined up. Each drill shaft assembly is composed of a drill shaft 20 on the inner end of which a chuck 15 is mounted, and the outer end 21 of which is adapted for connection to a drill for turning the shaft. The shaft is slidably mounted within a sleeve having an outer thread 28 and an axial groove 29 registering with the key 30 for guiding the sleeve axially within the sleeve 31 to which the end of the inner stirrup 2 and the worm gear 32 are rigidly connected. The sleeve 28 has a clamp means 33 at its inner end, its outer end 34 being knurled for manual axial adjustment upon lifting of the half-nut 35 from the thread 28 by operation of the cams 36 through the squeeze levers 37 on the outside of the half-nut mechanism casing 38. The casing 38 is knurled around its periphery to provide a good grip for manual operation thereof. This casing is mounted on the sleeve 39 rotatably attached to the wormwheel casing 40 and has a flange 41 therein for restriction against axial movement.

Relative rotation between the stirrups for preliminary setting of the stirrup 2 about the axis 3 is obtained by loosening the knurled nut 42 and manually turning the stirrup 2 to any approximate position desired and then retightening nut 42 to bring the corrugated faces 43 into registry again in the new position. For finer adjustment of the angular relationship between the inner and outer stirrups the handle 27 fixed on the end of the shaft of the worm 44 is turned whereby a fine adjustment of the wormwheel 32 and the stirrup 2 through the intermediate connections is obtained, together with the simultaneous adjustment of the drill shaft assemblies.

In operation when it is desired to turn the drill shaft the clamp 33 is loosened and a drill is applied to the end 21, the shaft being free to move axially to any position desired while the drill is operated. Upon completion of the drilling operation the clamp 33 is tightened, and if a quick axial adjustment is desired the half-nut 35 is lifted off the thread 28, and by means of the knurled end 34 the drill shaft assembly may be quickly moved axially to any new position desired. For finer axial adjustment of this assembly the half-nut housing 38 is turned by hand after allowing the half-nut to engage the thread 28.

Any number of drill shaft assemblies may be provided with this instrument, with carriages for mounting them on either of the stirrups. These assemblies have a similar construction to the above assemblies with respect to their axial adjustment and operation by a drill, but are mounted in a ball fitting comprising the ball and socket joint 5. The socket portion is integral with the carriage 16 which may be slidably attached to the stirrup. This carriage has a piece 45 forming the outer end of a clamping groove and has two guide pins 46 and 47' affixed thereto and slidable in bores 47' and 48 respectively within the carriage. A third pin 49 is also affixed thereto in parallel relation to the other pins, and passes through a parallel bore the other end of which is countersunk. The end of this pin extending within the counterbore is threaded. Another piece 50 of the carriage is hinged at 51 thereto, and forms the outer half of the ball socket, having a bore at its outer end, through which a clamping screw having inner threads fitting over the threaded pin 49 is passed for clamping the ball and socket joint, by turning the handle 52, fixed to said clamping screw. Thus it may be seen that this screw may be used for setting the drill assembly at any desired point of either stirrup and turned in any angular direction with respect to the bone fragments, since it operates on both the ball and socket joint as well as on the clamping means to the stirrup.

The ball joint of the ball and socket fitting is made up of two halves 53 and 54, joined by dowel pins 55, and has a set screw 56 incorporated therein, which has an extension lug 57 that fits into the axial groove 58, which serves the same purpose in this drill assembly as the groove 29 in the drill assemblies previously described. In this case however instead of the key 30, the lug 57 is used in cooperation with this groove.

Any suitable connection may be made between the gauge 13 and the traction screws 9 whereby the force exerted between the ends of these traction screws is transmitted to the gauge and indicated thereon for continuous observation.

A brief description of the use of the present device will now be given in illustrative fracture cases.

In the case of fracture of the radius, the patient is made to lie down, face downward, the instrument is brought alongside with the inner stirrups in raised position, and the arm inserted through both stirrup assemblies. Two carriage assemblies are attached to the proximal inner stirrup. One of these may be substituted by one of the axial drill assemblies mounted in the ends of the stirrups. Likewise, in the stirrup assembly nearest the end, two drill assemblies are used. The operation and reduction of this single, long bone is identical with that of any other long bone, merely by turning handles 22, 26, 27 and 12 in the base, until approximation has been effected.

In the case of a fracture of the clavicle, the instrument is applied by moving it near the patient's head while he is reclining on his back. A sandbag is placed beneath the vertebral column high up between the shoulder blades. This is done in order to reduce the fragments as much as possible. In this fracture, one fragment is generally depressed and the other relatively elevated, and one lies generally in front of the other. A carriage assembly is attached to the inner stirrup in each half of the instrument, and these are brought into close approximation to the shoulder blade. The ball and socket mechanisms are made fast by turning the thumb screws. By turning the handle 12 in the base, the fragments move anteriorly or posteriorly, respectively. By turning the half-nut mechanism in the carriage assembly, the fragments are elevated or depressed. Small threaded pins are used. After reduction is effected, a felt pad is placed over the clavicle, a plaster of Paris splint is applied over the clavicle incorporating within it the screws with lugs attached thereto, in order that positive fixation will be obtained. The chucks are detached, and in turn the device is detached.

In the case of a fracture of the metatarsal No. 1 or other metatarsals of the foot, the instrument is applied by placing it near the bottom of the foot, the patient lying on his back, with the ends of the stirrups straddling the foot in a position so that a pin may be driven through and through the forefoot and held by lugs at its ends, mounted on screws held by chucks of two drill assemblies, fixed in carriages mounted on the inner stirrup of the outer stirrup assembly. A pin is driven into the lower quarter of the tibia for the purpose of fixation. The inner stirrup assembly is aligned so that the two carriage assemblies mounted axially in the ends of these stirrups are attached and properly aligned with this pin, so that by turning the half-nut mechanisms on the inner stirrup assembly, traction is exerted upon the pin driven through the metatarsals. It is to be noted that the screws are threaded into the lugs above-mentioned, so as to rigidly fix them thereto. Plaster of Paris bandages are then applied so as to incorporate the screws and the lugs. The instrument is then detached.

In the case of a fracture of the os calsis, the patient is made to lie on his back and the instrument is moved under the foot. Only one of the stirrup assemblies is necessary for this operation. A pin is driven through the os calsis. Lugs are attached to this pin. A screw is transfixed into the lower quarter of the tibia for purposes of fixation of the foot and ankle, on the axis of the stirrup assembly. The inner stirrup is aligned and two carriage assemblies are attached to it and aligned to conform with the direction of the desired pull, such that the so-called salient angle of approximately 30° will be restored and that the normal arch made by the os calsis and the other tarsal bones will approach the normal. The screws of the two carriage assemblies are threaded into the lugs. The pins driven into the tibia and os calsis with lugs attached, are then incorporated into a plaster of Paris boot. The device is detached by releasing the chucks from the pins and the instrument removed.

In the case of a Pott's fracture, the instrument is positioned in the same manner as before, using only one of the stirrup assemblies for the operation, while the other stirrup may be used as a support under the calf of the leg. The lower fragment of the fibula is transfixed by two threaded pins, one in the pivot of the inner and outer stirrup ends, the other in a carriage assembly attached to the inner stirrup. Only one of the stirrup assemblies is necessary in the reduction of this type of fracture just as in the above operation. This fragment is elevated or depressed. The fragment is brought inwardly or outwardly by turning the handle 27. Axial rotation is effected by turning handle 22. Over-ride of the lower over the upper fragment is corrected by turning the handle attached to the traction screw in the base. It will be noted that the upper fragment which is long and generally not depressed does not require manipulation. If it does require manipulation, the upper stirrup may be used for this purpose. The threaded pins in the fibula with lugs attached are then incorporated in a plaster of Paris boot which is applied in such fashion that the medial malleolus is not incorporated into the plaster but left free for subsequent transfixation by a threaded pin, as will be later described. The chuck is released and the carriage assembly is detached leaving the threaded pin in the axis of the inner and outer stirrup ends attached. The reason for this will be seen in the following description.

The next step is to rotate the inner stirrup away from the foot through 90° more or less. The carriage assembly is reattached to the inner stirrup and aligned so as to point from the inner side of the foot toward the fractured tip of the inner ankle bone. A small threaded pin is transfixed thereby into the fractured tip, purposely left free from plaster applied during the first step of this operation. By means of the half-nut mechanism in the carriage assembly, this fractured tip of the tibia is approximated to the side from which it was broken. A lug is attached to this threaded pin and the plaster of Paris bandage is then completed, incorporating the third threaded pin and its lug. The chucks are detached from the threaded pins and the reducer is removed.

In the case of a fracture of both bones of the forearm the patient is made to lie down on his face and the instrument is moved over the arm the inner stirrup being moved into the raised position. Seven fixation screws are used in this operation. In all other fractures of long bones, two screws are used, one into each fragment for full control. This is not possible here, inasmuch as the elbow, the radius and the ulna do not lie in the same plane and therefore only three or four pins can be used through the axes of the inner and outer stirrups.

In this operation, one or the other of the long bones of the forearm, preferably the radius, is reduced. It will be noted that in the fracture of both bones of the forearm four fragments are present instead of two, as in the ordinary fracture of a long bone, and therefore the problem is twice that seen in a fracture of one long bone. This is overcome by the so-called half-nut mechanism constructed into the device. The two remaining fragments, after the radius is reduced, are controlled completely in elevation or depression and side to side motion by turning the half-nut mechanisms. It is obvious therefore that the best position of the screws of the last two fragments, is the position of 90° one to the other, so that a true upward-downward and a true lateral position may be obtained. Final approximation of the aligned bone ends is then brought about by turning the handle on the traction screw in the base. Lugs are applied to the screws and all seven of these are incorporated in the plaster of Paris bandages. It will be well to note that in all other cases of fracture of single long bones, manipulation of the fragments by the half-nut mechanism is unnecessary, as full control of the fragment is obtained by gear mechanisms constructed into the device. That the half-nut is necessary in the fracture of both bones as well as in other separate features, is obvious because of the multiple mechanical problems involved. It will be noted that by compressing the handles controlling the half-nut mechanisms, a rapid cross movement of the drill rod is obtained, and then when these handles are released, they lock themselves. Fine adjustments are thereupon obtained by merely turning the half-nut mechanism serrated knobs. After the plaster of Paris is applied and set the device is removed in the usual manner.

In the case of a fracture of the neck of the femur, the instrument is applied under the thigh and the stirrup assemblies are adjusted and screws attached so they may be applied to the fragments. The heel-to-palm test is applied to insure that the fractured femoral neck has been reduced (using the Whitman or Leadbetter technique). With the leg internally rotated, abduction and internal rotation is retained by fixing the femur by a screw in the lateral epicondylar region. The proximal stirrups are adjusted so that two or more pins or wire, threaded or otherwise, may be driven into the trochanter neck and head, respectively, of the femur. No manipulation with the instrument is necessary, this having been done by hand. The instrument is used merely as a jig to insert two or more wires or threaded pins.

In the case of fracture of the femoral shaft, the instrument is applied as above and four threaded pins are used. These are transfixed into the regions of the greater trochanter and the lateral epicondylar regions of the upper and lower fragments respectively. The patient is placed preferably upon an adjustable surgical table so that the instrument may be adjusted to his extremity quickly. The well leg must be conveniently supported. Over-ride in this case is corrected by turning the base traction screw handle. Elevation and depression of the fragment is corrected by turning the inner stirrup's handle. Rotation of either fragment along the axis is corrected by turning handle 22 while lateral medial displacement of either fragment is corrected by turning handle 26. It will be observed that this operation is identical with that of any long bone operation. As in all the other cases adequate space is present for the application of plaster, and for the use of the fluoroscopic screen.

In the case of a fracture of the metacarpal No. 1 (or other metacarpals), the instrument is placed under the fractured hand, only one stirrup assembly being necessary, and a small screw is threaded into the mid-phalynx of the thumb prior to insertion of the screw into the lower end of the radius. The inner stirrup is turned over the forearm and a small screw is transfixed into the lower end of the radius by means of the drill shaft mounted on the axis of the stirrups. A carriage assembly is attached to the inner stirrup over the forearm and is aligned so that the direction of pull will be in the long axis of the thumb. A screw mounted in the chuck of this carriage assembly is threaded into a lug mounted on the screw inserted into the mid-phalynx of the thumb. By turning the serrated knob of the half-nut in this carriage assembly, traction in this direction will be obtained and over-ride corrected. Manipulation of the fragment is possible by manipulating the inner stirrup up or down. When reduction is affected a lug is attached to the pin in the lower end of the radius and a plaster of Paris bandage is applied around the wrist and lower portion of the thumb leaving fingers 2, 3, 4 and 5 free for use. Thus it is seen that any single fingers may be reduced in exactly the same manner and fixed in plaster of Paris bandages, leaving the other four fingers free for use.

Similar operations are performed for other fractured bones of the extremities or elsewhere, and the use of the instrument may be greatly extended after some practice, to regions of the body which are more inaccessible; also, better technique is developed with more experience in all of these operations.

This instrument may be provided with a carrying case of suitable shape and size, having a drawer constructed into its lower portion, to accommodate pins, screws, lugs and detached carriage assemblies. The various parts of this device may be dimensioned in accordance with the specific applications for which they are intended, and many modifications in form and arrangement may be made without departing from the spirit and scope of this invention, as defined in the appended claims.

It is to be observed that in cases where swelling is present the application of the plaster of Paris may be postponed and the pins or screws held in place by keeping the reducer device attached for some time, until the swelling goes down. The plaster of Paris is then applied and the reducer detached.

The invention described herein may be manufactured and used by or for the Government of the United States of America for governmental purposes without the payment of any royalties thereon or therefor.

I claim:

1. In a fracture reducer, a base, a slidable support thereon, means for slidably adjusting said support, said support having a swivelled upper portion, means for adjustably turning said upper portion, a pair of semi-circular stirrups concentrically joined by pivots at their ends, the outer stirrup being circumferentially adjustable on said support, means for adjusting the inner stirrup angularly about said pivots, a drill shaft assembly axially mounted through each pivot, and one or more carriages for additional drill shaft assemblies having clamping means for mounting upon said stirrups.

2. In a fracture reducer, a base, a slidable support thereon, means for slidably adjusting said support, said support having a swivelled upper portion, means for adjustably turning said upper portion, a pair of semi-circular stirrups concentrically joined by pivots at their ends, the outer stirrup being circumferentially adjustable on said support, means for adjusting the inner stirrup angularly about said pivots, a drill shaft assembly axially mounted through each pivot, one or more carriages for additional drill shaft assemblies having clamping means for mounting upon said stirrups, each of said drill shaft assemblies comprising a drill shaft, a chuck mounted on the end of said shaft having means for tightening over a drill or pin, inserted therein, which will not loosen upon reversal of direction of operation of said drill, said drill shaft having its other end adaptable for receiving a drill to operate it, clamping means for fixing said drill shaft against said displacement, and means for axially individually adjusting said drill assemblies.

3. In a fracture reducer, a base, a slidable support thereon, means for slidably adjusting said support, said support having a swivelled upper portion, means for adjustably turning said upper portion, a pair of semi-circular stirrups concentrically joined by pivots at their ends, the outer stirrup being circumferentially adjustable on said support, means for adjusting the inner stirrup angularly about said pivots, a drill shaft assembly axially mounted through each pivot, one or more carriages for additional drill shaft assemblies having clamping means for mounting upon said stirrups, each of said drill shaft assemblies comprising a drill shaft, a chuck mounted on the end of said shaft having means for tightening over a drill or pin, inserted therein, which will not loosen upon reversal of direction of operation of said drill, said drill shaft having its other end adaptable for receiving a drill to operate it, clamping means for fixing said drill shaft against said displacement, and means for axially individually adjusting said drill assemblies, said drill shaft assemblies mounted at the pivots being adjustable with the inner stirrup.

4. In a fracture reducer, a base having two supports and stirrup assemblies such as claimed in claim 1.

5. In a fracture reducer, a base having two supports and stirrup assemblies such as defined in claim 2.

6. In a fracture reducer, a base having two supports and stirrup assemblies such as defined in claim 3.

7. A fracture reducer such as defined in claim 1, wherein the means for slidably adjusting the support comprises a threaded shaft operated by a handle at one end thereof and passing through a half-nut mechanism in said support, and means for lifting the halves of said half-nut from said threaded shaft, so as to be able to quickly move said support to a new position without the necessity of turning the threaded shaft.

8. A fracture reducer such as defined in claim 1, wherein the means for slidably adjusting the support comprises a threaded shaft operated by a handle at one end thereof and passing through a half-nut mechanism in said support, and means for lifting the halves of said half-nut from said threaded shaft so as to be able to quickly move said support to a new position without the necessity of turning the threaded shaft, and wherein the means for turning the upper portion of said support comprise a worm operated by handle mounted in said upper portion and a wormwheel mounted in the lower portion thereof.

9. A fracture reducer such as defined in claim 1, wherein the means for circumferentially adjusting the outer stirrup in said support comprises a worm operated by a handle in the upper portion of said support, and a series of worm gear teeth turned in the outer face of said outer stirrup meshing therewith.

10. In a fracture reducer, a base having two supports and stirrup assemblies such as claimed in claim 1, said drill shafts on the carriages being supported in ball and socket joints for universal adjustment, which joints have clamping means tightening simultaneously with the carriage clamps on the respective stirrups by a common tightening means, the drill shaft of each drill shaft assembly being slidably mounted in a sleeve on which said drill shaft clamping means are fixed, said sleeve having an outer thread passing through a half-nut mechanism and having an axial groove for axially guiding it through the ball joint, means fixed to said ball joint extending into said groove, a housing for said half-nut mechanism rotatably connected to said ball joint but restricted against axial motion relative thereto, and having guides for turning said half-nut therewith and means for lifting the halves of said half-nut from the threaded sleeve for quick axial adjustment of said sleeve.

11. In a fracture reducer, a base having two supports and stirrup assemblies such as defined in claim 3, means for angularly adjusting the drill shaft assemblies mounted at the pivots together with the inner stirrup about said pivots, comprising a worm and wormwheel housing fixed to the outer stirrup, a wormwheel mounted therein and connected to the inner stirrup and a worm meshed with said wormwheel within said housing having a shaft extending therethrough and an operating handle fixed to the end of said shaft on the outside of said housing.

12. In a fracture reducer, a base having two supports and stirrup assemblies such as defined in claim 3, means for angularly adjusting the drill shaft assemblies mounted at the pivots together with the inner stirrup about said pivots, comprising a worm and wormwheel housing fixed to the outer stirrup, a wormwheel mounted therein and connected to the inner stirrup and a worm meshed with said wormwheel within said housing having a shaft extending therethrough and an operating handle fixed to the end of said shaft on the outside of said housing, and a separable coupling in the connection between the wormwheel and the inner stirrup assembly comprising annular corrugated faces and a lock-nut for interlocking said faces, whereby upon loosening said lock-nut the stirrup assembly may be quickly turned to a new angular setting and the lock-nut retightened for further adjustment by the worm handle.

JOSEF H. GIESEN.